Patented Nov. 12, 1940

2,221,690

UNITED STATES PATENT OFFICE 2,221,690

THERAPEUTIC COMPOSITION

Kenneth C. D. Hickman, Rochester, N. Y., assignor, by mesne assignments, to Distillation Products, Inc., Rochester, N. Y., a corporation of Delaware No Drawing. Application March 20, 1937, Serial No. 132,090

6 Claims. (Cl. 167—81)

This invention relates to improved therapeutic agents and especially to new compositions of fat soluble vitamins.

An object of the invention is to provide improved therapeutic vitamin compositions having enhanced physiological activity. Another object is to provide new compositions, containing fat soluble vitamins, which have a superior therapeutic action. A further object is to provide concentrates of vitamins A and/or D in which the activity is increased by association with a highly unsaturated glyceride. A still further object is to provide compositions containing vitamins A and/or D, the vitamin content of which can be more readily utilized by the animal body. Other objects will appear hereinafter.

I have found that these and other objects can be accomplished in accordance with the hereindescribed invention by associating vitamin concentrates, such as those of fat soluble vitamins, with a highly unsaturated oil before administration. The presence of the highly unsaturated oil in some unknown manner increases the availability of the vitamin to the animal body, so that it is more easily and completely utilized.

Natural animal or vegetable oils, fractions thereof, or synthetic glycerides having an iodine number above 170 are most useful. The desirable action increases with increase in unsaturation and it is, therefore, preferred to employ drying or semi-drying oils and especially those which have an iodine number of above about 170. While oils having a slightly lower iodine number than 170 can be used, the activity decreases markedly with decrease in iodine number below this value and it is, therefore, preferable to use an oil having an iodine number of at least 170. Linseed, walnut, perilla and hempseed oils are examples of suitable oils.

The vitamin concentrates can be incorporated in the highly unsaturated oil in any desired manner to give any required potency. Very small amounts of the unsaturated oil have been found to give decided benefits and it is, therefore, most desirable to employ highly concentrated solutions of the vitamin in the oil. The lower limit of dilution will be governed by the minimum daily dose of vitamin A and the maximum daily dose of unsaturated oil required. Ten thousand units of vitamin A to one-half ounce of unsaturated oil is an example of a low potency mixture of this nature. At the other extreme a daily dose of twenty thousand units of vitamin A contained in three minims of parent fish oil may be blended with one to six minims of linseed oil. Mixtures giving best results are intermediate between these two ranges and the one found to be most satisfactory for general therapeutic use contains about fourteen thousand units of vitamin A in six minims of parent fish oil and blended with six minims of unsaturated oil, making a total concentration of fourteen thousand units in twelve minims, one half of which is the unsaturated oil. Vitamin D may also be added to the above mixtures usually in amounts sufficient to give a daily dose of at least 300 U. S. P. units with 600 U. S. P. units for children. Vitamin D is seldom administered alone, but in cases where only its action is desired it may be mixed with the oil in the proportions given. Larger proportions of vitamin D are indicated when abnormally high doses are required for the treatment of certain diseases. Such conditions may in some cases require the administration of as high as a million units to one ounce of oil. The parent fish oil referred to enables convenient handling of the concentrate but is otherwise inert and its use can be eliminated if desired.

Concentrates for addition to the unsaturated oils may be prepared by any of a number of different well known methods.. Molecular distillates of fish oils prepared, for instance in the manner disclosed in my U. S. application #112,847, filed November 11, 1936, now Patent No. 2,180,356, November 21, 1939 and Patent No. 1,925,559, are especially suitable, but those prepared by saponification of fish oils and extraction of the non-saponifiable portion are also satisfactory.

It is preferable to use a purified oil and this is especially true when the vitamin is diluted with large amounts of the unsaturated oil. In such cases, a relatively large dose of the oil-vitamin mixture must be taken and if impurities are present in the oil it generally would not be well tolerated. Oils purified by known methods can be employed, but I prefer to use an oil which has been purified by molecular distillation at a temperature between about 150° and 300° C. This process yields a highly unsaturated bland oil free of acids, proteins and other poisonous materials which can be easily ingested and is far superior to other purified oils. Purification in this manner is of further advantage since the unsaturated components of the oil can be segregated in a single fraction and the more saturated constituents eliminated. The production of such distillates is disclosed in my co-pending application No. 37,750, filed August 24, 1936, now Patent No. 2,126,466, August 7, 1938, of which this application is a continuation in part. Regardless of the method of purification employed, it is desirable to use an oil which is low in free fatty acid content and which can be ingested in the amounts administered without symptoms of intolerance.

The compositions which form the subject matter of my invention have been administered to a large number of people under such conditions that the physiological action could be compared with the activity of ordinary concentrates and of ordinary medicinal cod-liver oil. It was found that my new compositions gave decidedly superior increases in body weight, which were entirely out of proportion with the nutritional value of the small amount of oil present. With cod-liver oil, large amounts of oil were necessarily taken and the increase in weight was roughly proportional to that, due to its nutritional value. Weight increase with ordinary concentrates was slight. The new compositions were also found to give superior resistance to colds of all sorts and especially heavy colds. It has furthermore been found that the unsaturated oil counteracts the harmful effect of any free fatty acids contained in the vitamin concentrates.

It has been recognized that whole fish oils are superior therapeutically to concentrates, if the patient is sufficiently hardy to ingest the large volume of odoriferous oil necessary for adequate doses. By adding highly unsaturated oils to the concentrates, a therapeutic agent results which has the advantages of being concentrated, so that smaller amounts can be taken, and of conferring weight increase and resistance to colds superior to that of the natural fish oils.

As many widely different embodiments of my invention may be made without departing from the spirit or scope thereof, it is to be understood that the invention is not limited to the specific embodiments described except as defined in the appended claims.

What I claim is:

1. A therapeutic agent comprising a glyceride oil having an iodine number above about 170 and concentrated vitamin A or D.

2. A therapeutic preparation comprising a high vacuum distillate of an oil having an iodine number above about 170 in association with a fat soluble vitamin concentrate.

3. A therapeutic preparations comprising a molecular distillate of a natural oil which distillate has an iodine number of above about 170 in association with a fat soluble vitamin concentrate obtained by the molecular distillation of a fish oil.

4. A therapeutic preparation comprising a high vacuum distillate of linseed oil in association with a concentrate of a fat soluble vitamin obtained by the high vacuum distillation of a fish oil.

5. A therapeutic preparation comprising a high vacuum distillate of linseed oil in association with a concentrate of vitamin A.

6. A therapeutic preparation comprising a high vacuum distillate of linseed oil in association with a concentrate of natural vitamin D.

KENNETH C. D. HICKMAN.